UNITED STATES PATENT OFFICE.

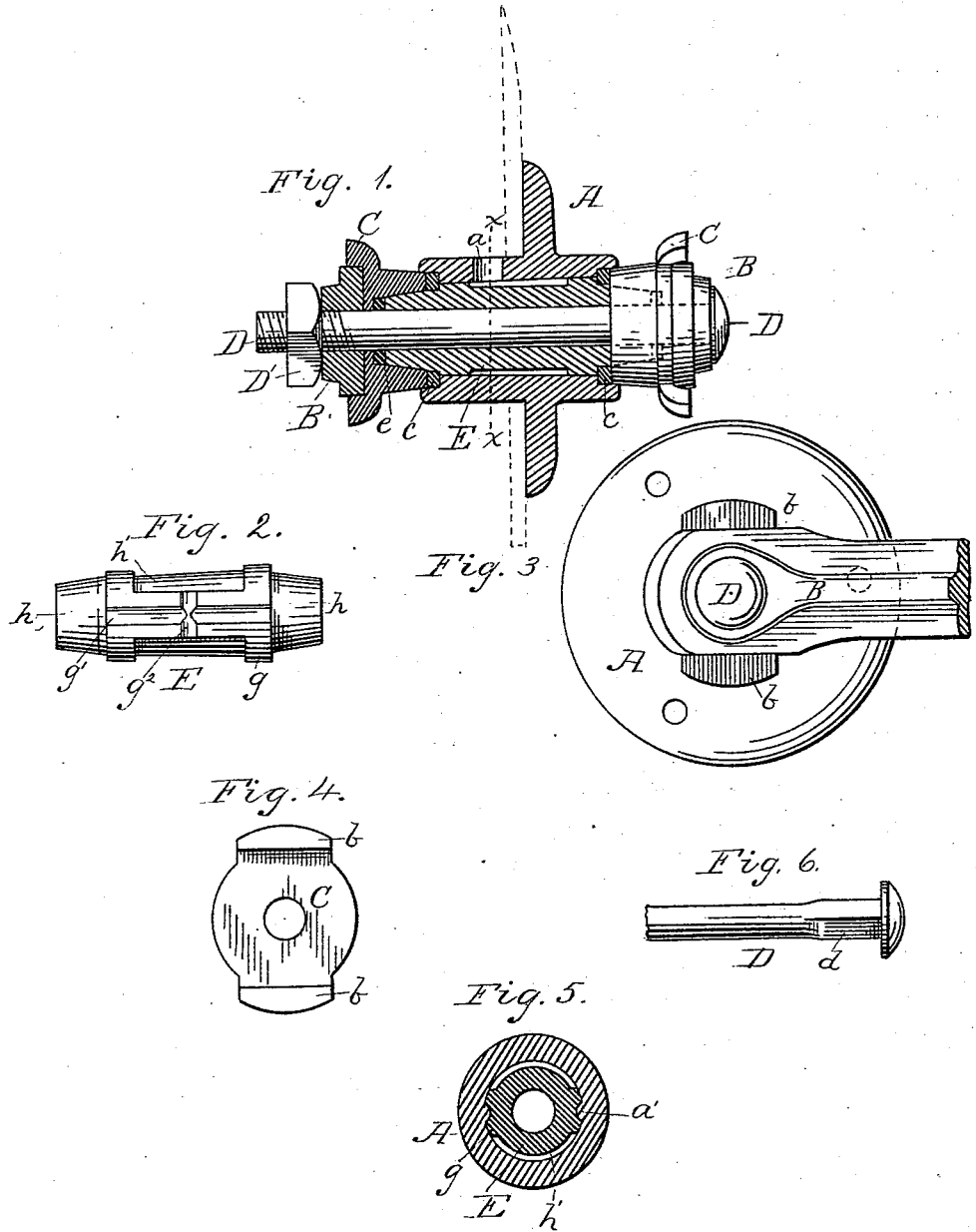

CHARLES R. HARTMAN, OF VINCENNES, INDIANA.

HUB FOR WHEEL-COLTER.

SPECIFICATION forming part of Letters Patent No. 278,950, dated June 5, 1883.

Application filed November 2, 1882. (No model.)

*To all whom it may concern:*

Be it known that I, CHARLES R. HARTMAN, of Vincennes, county of Knox, and State of Indiana, have invented certain Improvements in the Hubs of Wheel-Colters, of which the following is a specification.

My invention relates to the construction and combination of the parts of a hub upon which is mounted and fastened a wheel-colter, which hub is provided with end journals upon which it turns in suitable bearing-pieces supported by a yoke, or otherwise; and my said invention will be hereinafter more fully described with reference to the accompanying drawings, in which—

Figure 1 represents a view, partly in section, of the entire hub and connecting parts; Fig. 2, a detail view of the sleeve E, it being part of the hub; Fig. 3, a side elevation of the hub-flange A, part of yoke-arm B, and head of the axial bolt D, a bearing-piece, C, in proper position; and Figs. 4, 5, and 6, details of one of the bearings C, a cross-section of the whole hub, taken as indicated by the broken line $x$ $x$ in Fig. 1, and a portion of axial bolt D.

A is a flange provided with a hollow cylinder, having an abutting-shoulder in each end of the interior of such cylinder, against which the washers $c$ $c$ are forced by the bearing-pieces C C, and the interior of the cylinder is provided with longitudinal ribs $a'$ to interlock with grooves $g'$ in the exterior of the sleeve E to prevent its turning in the hub. The sleeve E is slightly tapered from one end toward the other to facilitate the casting of flange A and its cylinder (into which the sleeve is designed to fit snugly) without coring, and its ends are in frusto-conical form, with abrupt shoulders, and serve as journals for the hub, and turn in correspondingly-cupped bearings C C, which latter have lugs $b$ overlapping the arms of the colter-yoke B, to prevent turning of the bearings. At $h'$ on that part of the sleeve resting in the cylinder of the flange, enough of the exterior surface of the sleeve is cut away for oil-chambers to hold a sufficiency of lubricating-oil for several days' working use, which is poured in at the oil-hole $a$ in the cylinder, directly over one of the chambers, and, as the oil is being poured in, the opposite chamber is filled at the same time with the upper one through the transverse groove $g^2$, when the oil-hole is closed by a cork stopper, large end down, so that the larger end may spread in the chamber to prevent the cork being lost out or pulled out by trash. The oil is kept in the hub and gradually fed to the journals by the close-fitting leather washers $c$ $c$, and retained in the cups of the bearings C C by leather washers $e$ $e$, which fit tightly on the axial bolt D and in their recesses and also by the washers $c$ $c$, which also exclude all dust and grit from the journals. The ends of the hub proper (cylinder of flange A) break joint with the bearings C C, and make a snug fit to exclude dirt, which otherwise would absorb the oil from the washers $c$ $c$. The leather washers are also especially designed to prevent wear of the shoulders of the hub, so that, upon the wearing away of the journals and bearings, the sleeve and bearings are replaced by new ones, which can be done at a trifling expense, as the hub will not be too short for the sleeve. Besides, as they (and also washers $e$ $e$) prevent friction of the abutting shoulders, the parts may be drawn up more tightly for the steady holding of the colter relatively than when the abutting shoulders are nakedly exposed to friction upon one another, in which latter case the colter is apt not to revolve but slide along in soft ground, when the nut of the axial bolt has been drawn up to prevent wabbling of the colter. The sleeve is designed to be made of hard wood, cast-iron, or other suitable material, and is held in its place in the hub longitudinally by the abutting bearings, which are held to their places with the rest of the hub by the axial bolt D, and adjustably so, for as the journals and bearings wear away the play is taken up by the nut D'. The colter-blade is riveted to the flange A, and the longer end of the cylinder, which extends through the blade, and the central hole of the blade are of the same diameter as the hub, so that the blade cannot cut the rivets nor work them loose by bearing against them.

The lubricating-oil having no other outlet from this hub than that of oozing through and from the leather washers $c$ $c$ to lubricate the journals $h$ $h$, and the flanged cylinder A being cast in one solid piece in the shape shown— that is, with rib or ribs $a'$ in interior, and shoulders in its ends and rivet-holes in its flange without coring, that is, drawn from the sand in that shape—is a very valuable feature of economy in this hub, and, besides, the axis of the cylinder or hub cannot but be at right angles with its flange, and consequently at right angles with the colter-blade, which prevents its wabbling as it revolves. The preferred shape of the sleeve and its seat in the hub is cylindrical, with rib and groove or ribs and grooves interlocking; but any irregular diameter or other equivalent devices to prevent turning of the sleeve in the hub will answer; and, if preferred, the oil-hole $a$ may be screw-threaded and a set-screw inserted, extending into the sleeve, and the ribs $a'$ and grooves $g'$ dispensed with.

On account of economy, I use this hub with the solid flange only; but, if preferred on account of appearance, a loose flange may be used on the opposite side of the colter-blade to the fixed one.

What I claim as new, and desire to secure by Letters Patent, is—

1. The flange A, provided with hollow cylindrical extensions on each side, with interior shoulders in such extensions, and with longitudinal ribs $a'$, substantially as and for the purpose described.

2. The sleeve E, having longitudinal grooves $g'$, and journals $h\ h$, in frusto-conical form, and abutting shoulders, and the middle portion, as at $h'$, cut away, substantially as and for the purpose described.

3. The combination of the described hollow cylinder, having the flange A in one piece therewith, and provided with ribs $a'$, extending through the interior of the same, and the sleeve E, provided with exterior grooves, $g'$, in correspondence with such ribs, substantially as described.

CHARLES R. HARTMAN.

Witnesses:
R. J. GREENHOW,
C. J. AGNEW.